Patented May 19, 1953

2,639,277

UNITED STATES PATENT OFFICE 2,639,277

MELAMINE-FORMALDEHYDE RESINOUS COMPOSITION WITH FILLER

Andrew A. Varela, Old Greenwich, Conn., assignor to American Cyanamid Company, New York, N. Y., a corporation of Maine No Drawing. Application October 23, 1951, Serial No. 252,791

4 Claims. (Cl. 260—39)

This invention relates to resinous compositions and, more particularly, to resinous compositions having diminished toxicity at decomposition temperatures. Still further, this invention relates to a resinous composition which comprises about 35–45% by weight of a melamine-formaldehyde resin and, correspondingly, about 55–65% by weight of a filler, which is comprised of about 10–20% by weight, based on the total weight of the filler, of china clay and, correspondingly, 80–90% by weight, based on the total weight of the filler, of glass fibers.

One of the objects of the present invention is to produce a resinous composition which has diminished toxicity due to the evolution of HCN at decomposition temperatures. A further object of the present invention is to diminish the toxicity of the resinous composition at decomposition temperatures without impairing the flowability of the resinous composition. These and other objects of the present invention will be discussed more fully hereinbelow.

When melamine resin molded articles and laminated articles are heated at temperatures of about 600–700° C., the molded or laminated article tends to decompose with a resulting evolution of hydrogen cyanide. While the quantity of hydrogen cyanide liberated from heated melamine plastics is appreciable, it is really insignificant when compared to the large volumes of carbon monoxide, ammonia and other poisonous and obnoxious gases and smokes that are obtained when wood, wool, meat, linoleum and other common materials are heated to their decomposition points. The temperature ordinarily required to liberate hydrogen cyanide from melamine plastic materials is so high that the plastic itself is destroyed and all materials, with the exception of metals, that are commonly associated with the plastics, such as wool, cotton, paper, wood and the like, are destroyed at much lower temperatures. Nevertheless, it remains a fact that for certain usages, such as insulation panels and the like, and instrument panels and the like, there are times when the molded parts are, in fact, subjected to extremely high temperatures which result in a decomposition of the melamine resinous material which, in turn, of course, liberates the highly objectionable hydrogen cyanide gas. One of the ways that one can diminish the amount of hydrogen cyanide that will be liberated when the plastic article is heated to its decomposition temperature is to diminish the total amount of resinous material present in the molded article by advancing the ratio of filler over resin. If one increases the filler content to a point where it constitutes about 70% or more of the total weight of the composition, the tendency toward the liberation of toxic gases at decomposition temperatures is appreciably diminished. This might well appear to be a solution to the problem, except for the fact that when the amount of filler is increased, and the amount of resin is decreased, the resultant composition of resin and filler lacks sufficient flowability to be useful as a molding or laminating composition. As a consequence, it is considered advisable to approach the problem from another standpoint. I have discovered that I can maintain a proper resin:filler ratio, maintain the flowability characteristics of the resinous composition and still diminish appreciably the tendency toward the melamine resin to liberate the obnoxious hydrogen cyanide from the molded or laminated piece at the decomposition temperatures. This is accomplished by using 35–45% by weight of a melamine-formaldehyde resin and, correspondingly, about 55–65% of a filler which is made up of 10–20% by weight, based on the total weight of the filler, of china clay and, correspondingly, about 80–90% by weight, based on the total weight of the filler, of glass fibers. This composition has markedly diminished toxicity at decomposition temperatures. At the same time, this composition has the proper flowability characteristics which are needed for resinous compositions of the class described which are to be applied in molding and laminating fields.

The compositions of the present invention are essentially high impact molding compounds. This is the reason for using glass fibers. When greater quantities than 10–20% of china clay for improved flow is used, the impact strength (shock resistance) is reduced below desirable limits for this type of compound. The use of between 10–20% china clay gives the desired flow and the required impact strength.

The toxicity of melamine resin decomposition products has repeatedly shown that the quantity of gases evolved during pyrolysis is directly proportional to the quantity of organic material present, provided the test conditions are rigidly controlled. A panel board containing about 37% resin gave off about 3.2% of hydrogen cyanide after heating the specimen for 60 minutes at 650° C. The melamine resin molded article containing 50% resin yielded 4.6% by weight of hydrogen cyanide based on the total weight of the specimen after heating the specimen for 50 minutes at 650° C. A further melamine resin molded article containing about 40° of the resin yielded about 3.3% of hydrogen cyanide by weight, based on the weight of the specimen after heating for 60 minutes at 650° C. It can be seen from this that when the resin content is reduced 10%, there results a 28% reduction in liberated hydrogen cyanide. If one continues the reduction of the resin content, one continues to experience a diminution of the hydrogen cyanide which is liberated. When one diminishes the resin content appreciably below 35%, however, the flow-mold-flow characteristic of the resin composition is such that it is undesirable for practical commercial use. The amount of hydrogen cyanide evolved, however, still presents an appreciable problem at decomposition temperatures and, as a consequence, I have discovered that by using a combination filler comprising 10-20% by weight of china clay and, correspondingly, 80-90% by weight of glass fibers, wherein the percentages by weight are based on the total weight of the filler, I can diminish the toxicity of the decomposition resinous composition at decomposition temperatures without diminishing the resin contents. It should be noted that the threshold temperature at which the melamine resins evolve appreciable quantities of hydrocyanic acid has been determined as about 350° C., although substantial amounts of it are not liberated until the temperature reaches 550–700° C. At higher temperatures, such as about 750° C., the hydrocyanic acid evolution is completed within about 30 minutes.

In the practice of the process of the present invention, one may use melamine and formaldehyde in mol ratios varying between 1:1–1:6, respectively. It is, however, preferred that the mol ratio of the melamine to formaldehyde in the resinous composition be within the limits of 1:1.5–1:3, respectively.

Although one may make use of the resin in the composition in proportions varying between 35–45% by weight of the resin, based on the total weight of the composition, it is preferred to use about 40% by weight of resin, based on the total weight of the composition, the remaining material comprising filler. The china clay should constitute about 10–20% by weight, based on the total weight of the filler and the glass fibers should correspondingly constitute about 80–90% by weight, based on the total weight of the filler.

In order that the present invention may be more completely understood, the following example is set forth in which all parts are parts by weight. Any specific enumeration of detail should not be interpreted as limitations on the case except as indicated by the appended claims.

*Example*

A resinous exposition is prepared by blending 40 parts of a melamine-formaldehyde resin having a mol ratio of 1:2, respectively, with 9 parts of china clay and 51 parts of glass fibers. The composition is blended in a W & P mixer and has the following properties as a molding compound: flow-mold-flow in inches per inch, 0.041 to 0.049 and contains a volatile (Brabender) 30 minutes at 150° C. 2.5–3.5%. The optimum cure at 310° F. is 4–5 minutes and the minimum cure of the composition at that temperature is about 1½–2 minutes. The mold shrinkage is 2.0–2.9 mils and the after shrinkage after 48 hours at 220° F. is 2.5–3.1 mils; and the total shrinkage is 4.5–6.0 mils. The molded specimens had the following physical properties: flexural strength p. s. i., 10,000 to 16,000 and flexural deflection in mils of 60–72. The Izod impact strength in foot/pound per inch of notch is 4.00–6.00.

The toxicity of this molded article when subjected to treatment at decomposition temperatures, namely at 650° C. for 60 minutes, was diminished more than 25% liberated hydrocyanic acid as compared with a comparable composition containing 50 parts of resin and 50 parts of glass fibers. Furthermore, the flowability characteristics of the composition set forth hereinabove was markedly improved over the flowability of a composition comprising 40 parts of the melamine resin and 60 parts of the glass fibers and no china clay.

Additionally, one may make use of conventional modifiers and additives which are often used in molding compositions, such as mold lubricants or, more specifically, zinc stearate and the like. Still further, one may make use of pigments and plasticizers in the modification of the composition of the present invention.

The values referred to hereinabove with respect to flow-mold-flow are determined according to the following test. A charge of 60 grams of the molding composition at 20–30° C. is placed in the center of the bottom platen of a molding press, both platens of which are at a temperature of 290±2° F., which are so shaped and grooved as to produce a flat molded disc with concentric ridges one-half inch apart. The press is closed in 20 seconds and a force of 18 tons applied in 15 seconds and maintained during the cure time. At the end of the time required for cure, the piece is removed and cooled. The average measurement of the thickness taken in the ring about 2¼" from the center of the molded disc is recorded in mils or inches as the measure of the plasticity. For convenience, this testing of the plasticity or flow of the resin will be referred to as the "flow-mold-flow" test. The desired plasticity of such a molding composition should be about 0.02–0.06", but preferably 0.041–0.049", as determined by the flow-mold-flow test.

I claim:

1. A resinous composition having diminished toxicity at decomposition temperatures consisting of from 35 to 45% by weight of a melamine-formaldehyde resin and from 65 to 55% by weight of a filler, respectively, based on the total weight of said composition; wherein said filler consists of from 10 to 20% by weight of china clay and from 90 to 80% by weight of glass fibers, respectively, based on the total weight of the filler.

2. A resinous composition having diminished toxicity at decomposition temperatures consisting of 40% by weight of a melamine-formaldehyde resin and 60% by weight of filler, respectively, based on the total weight of said composition; wherein said filler consists of from 10 to 20% by weight of china clay and from 90 to 80% by weight of glass fibers, respectively, based on the total weight of the filler.

3. A resinous composition having diminished toxicity at decomposition temperatures consisting of from 35 to 45% by weight of a melamine-formaldehyde resin having a mol ratio of melamine to formaldehyde of 1:1.5 to 1:3, respectively, and from 65 to 55% by weight of a filler, respectively, based on the total weight of said composition; wherein said filler consists of from 10 to 20% by weight of china clay and from 90 to 80% by weight of glass fibers, respectively, based on the total weight of the filler.

4. A resinous composition having diminished toxicity at decomposition temperatures consisting of 40% by weight of a melamine-formaldehyde resin having a mol ratio of melamine to formaldehyde of 1:1.5 to 1:3, respectively, and 60% by weight of filler, respectively, based on the total weight of said composition; wherein said filler consists of from 10 to 20% by weight of china clay and from 90 to 80% by weight of glass fibers, respectively, based on the total weight of the filler.

ANDREW A. VARELA.

References Cited in the file of this patent

UNITED STATES PATENTS

| Number | Name | Date |
| --- | --- | --- |
| 2,344,733 | Ripper | Mar. 21, 1944 |
| 2,517,906 | Mayfield | Aug. 8, 1950 |